N. CAROLIN.
AIRPLANE.
APPLICATION FILED AUG. 23, 1917.

1,274,986.

Patented Aug. 6, 1918.
5 SHEETS—SHEET 1.

WITNESSES
H. T. Walker
A. L. Kitchin

INVENTOR
N. Carolin
BY
ATTORNEYS

N. CAROLIN.
AIRPLANE.
APPLICATION FILED AUG. 23, 1917.

1,274,986.

Patented Aug. 6, 1918.
5 SHEETS—SHEET 3.

WITNESSES
H. T. Walker
G. L. Kitchin

INVENTOR
N. Carolin
BY
ATTORNEYS

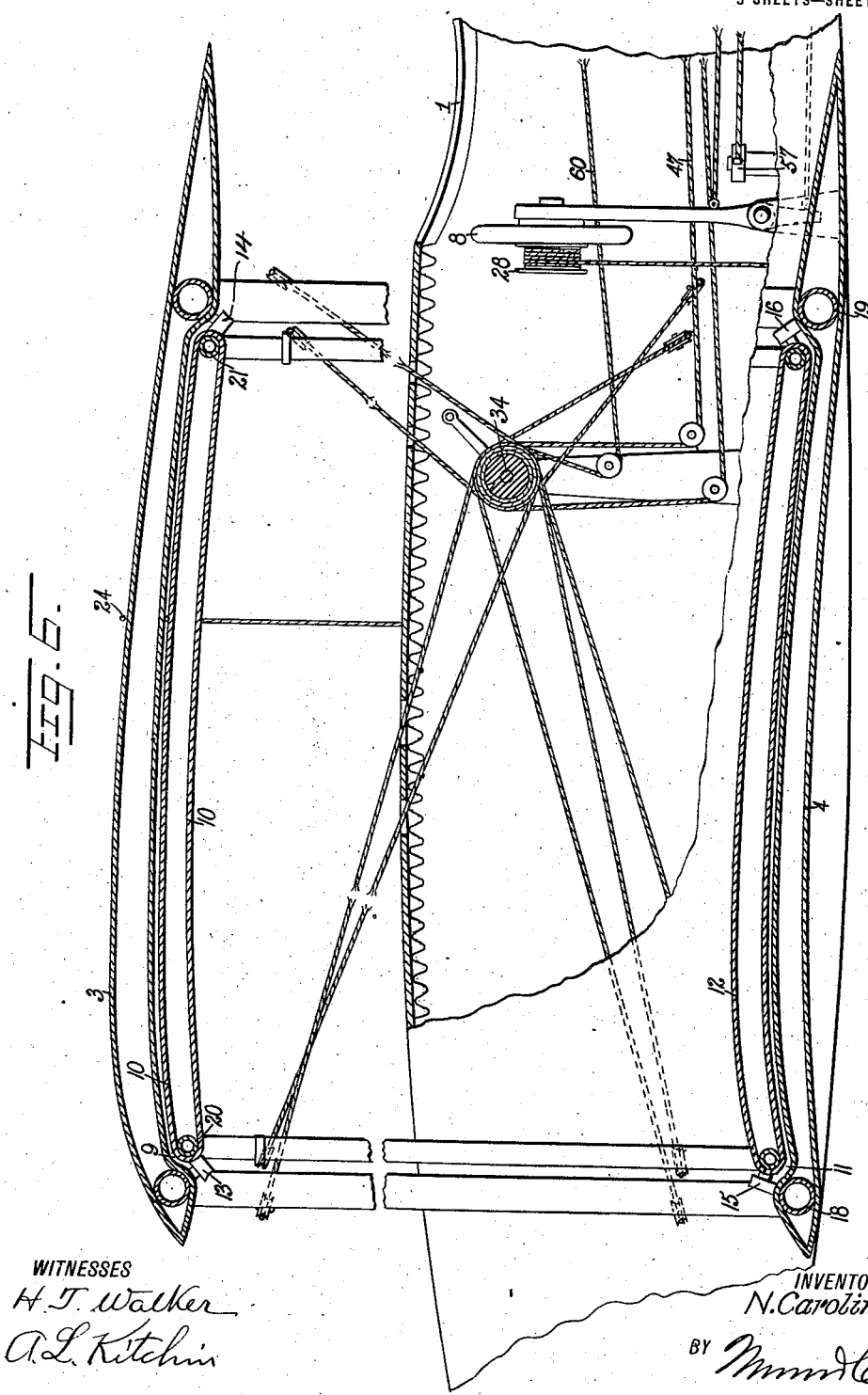

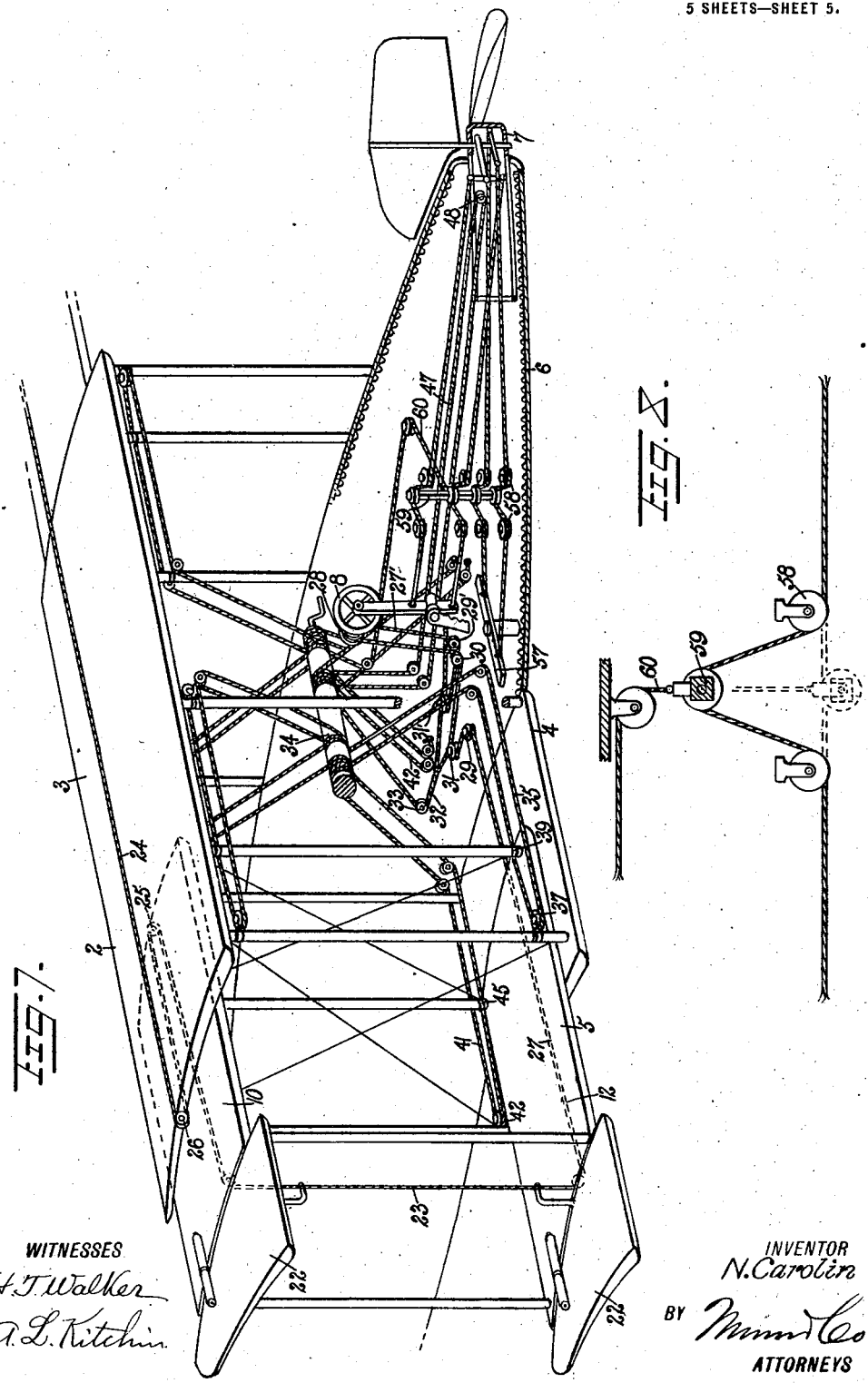

UNITED STATES PATENT OFFICE.

NORBERT CAROLIN, OF NEW YORK, N. Y.

AIRPLANE.

1,274,986.  Specification of Letters Patent.  Patented Aug. 6, 1918.

Application filed August 23, 1917. Serial No. 187,818.

*To all whom it may concern:*

Be it known that I, NORBERT CAROLIN, a citizen of the United States, and a resident of the city of New York, borough of Manhattan, in the county and State of New York, have invented a new and Improved Airplane, of which the following is a full, clear, and exact description.

This invention relates to airplanes, and has for an object the provision of an improved construction which may be adjusted so as to vary the head resistance, lifting planes and associate parts, so as to change the machine into a high speed or low speed machine at will.

Another object in view is to provide an airplane with sliding cells at the ends so as to increase and decrease the effective lifting wing surfaces.

A further object of the invention is to provide an airplane with adjustable wing members for increasing and decreasing the area of the lifting surface in connection with an adjustable fuselage extending member so that means are presented for varying the area of lifting surface and the distance of the elevating device on the fuselage from the center of gravity.

A further object, more specifically, is the provision of the extending of the rear of the fuselage and the expanding or contracting of wing surface without molesting or changing the usual control of the ailerons, rudder and elevator.

In the accompanying drawings:

Fig. 6 is a section through Fig. 1 on line 6—6, same being on a greatly enlarged scale.

Fig. 7 is an enlarged detail fragmentary perspective view of one end of the structure shown in Fig. 1 illustrating the arrangement of the controlling compensating cables and associate parts.

Fig. 8 is an enlarged detail horizontal sectional view through a compensating bar and associate parts showing how the extension tube carrying the rudder and elevator may be moved back and forth without affecting the controlling cables therefor.

Fig. 9 is a detail fragmentary sectional view showing how the end slidable cells are guided by rollers.

Figure 1:
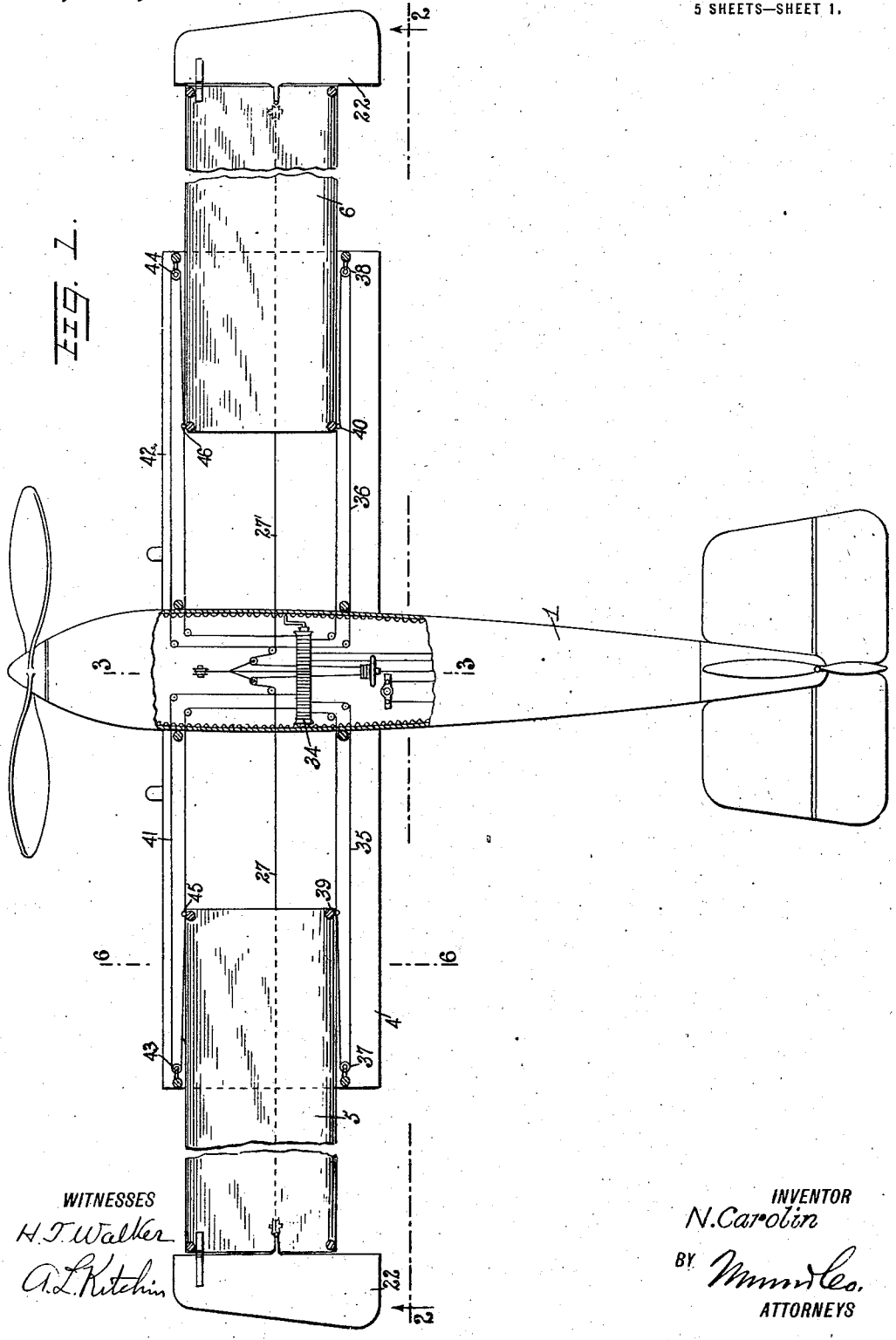
Figure 1 is a top plan view, with certain parts broken away, of an airplane disclosing an embodiment of the invention.
Figure 2:
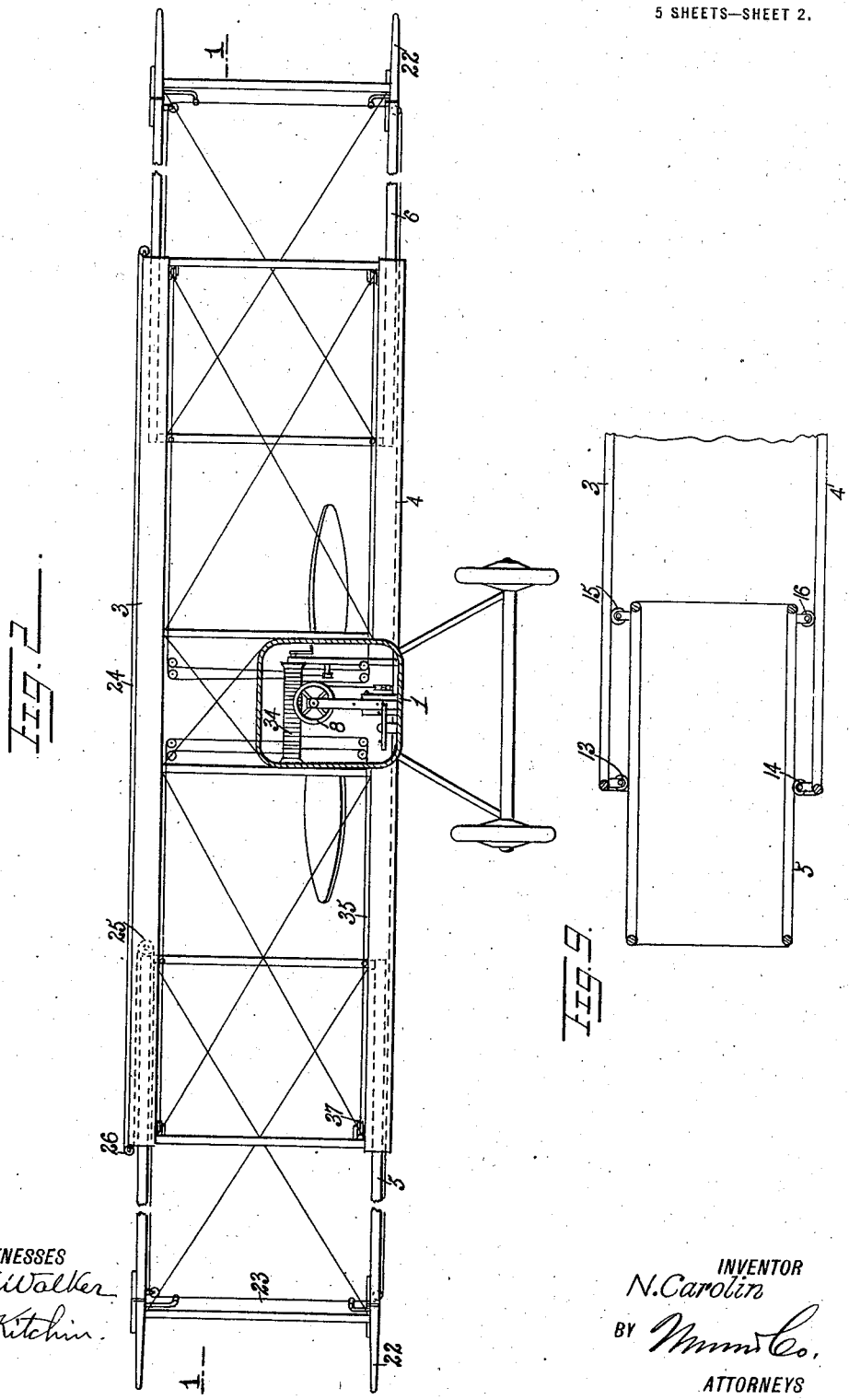
Fig. 2 is a section through Fig. 1 on line 2—2.
Figure 3:
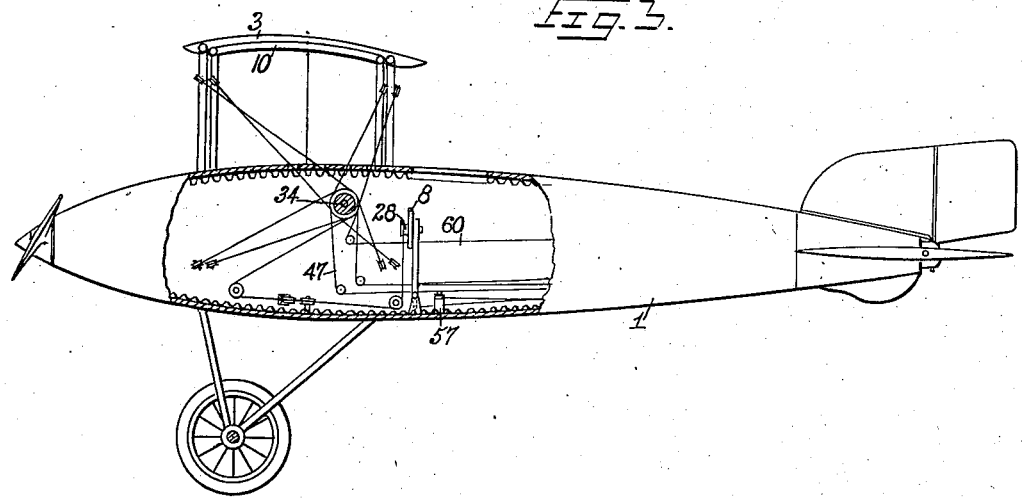
Fig. 3 is a side view of the structure shown in Fig. 1 with certain parts of the fuselage broken away for better illustrating the construction.

Referring to the accompanying drawings by numerals, 1 indicates a fuselage which may be of any desired kind, preferably of Monocoque aluminum fuselage type. Associated with the fuselage 1 is what might be termed a central lifting section or cell 2, comprising an upper wing or plane 3 and a lower wing or plane 4, these planes being of substantially the usual type. The drawings show a biplane, but it will be evident that the construction could be used with any form of multi-wing airplane without departing from the spirit of the invention. Arranged at each end of the central section of cell 2 are trussed slidable cells 5 and 6 as shown in Fig. 1, said cells being designed to be moved in and out as desired for increasing and decreasing the lifting surfaces. When nested or moved to a position within the central cell 2 the wing surfaces of the cells 5 and 6 fit into what might be termed depressions in the facing surfaces of the planes 3 and 4 so as to produce a substantially perfect stream line effect. The trusses and other parts are also arranged so as to be streamlined with the trusses of the central section 2, thus producing the proper lines for a very high speed air-plane when nested, though producing a very low speed airplane when extended. Also it will be evident that by thus nesting the parts, as more clearly shown in Fig. 6, a high efficiency is secured when arranged as a high speed air plane, though when arranged as a low speed airplane the lifting is much greater and the speed much lower together with a lower efficiency. In addition to providing sections 5 and 6 which may be moved in and out as set forth, an extension or tubular member 7 is provided at the rear end of the fuselage 1, which may be moved in and out to vary the moment of the controlling surfaces about the center of gravity and present a smaller or greater angle to the planes according to whether the same are being used at high speed or low speed. The extension 7, as well as the sections 5 and 6 are connected up with operating means near the steering wheel 8 so that the aviator may shift these parts at any time, namely on the ground or in the air. It is of especial advantage to be able to shift these parts while in the air whereby the airplane may be used for various purposes, as for instance, an observation or load-carrying plane or high speed fighting or messenger-carrying plane. When used for war purposes sections 5 and 6 may be extended in order to produce a low speed machine and thereby allow aviator or observer to properly view the country over which he is flying, while at the same time presenting means which will allow him to convert the machine into a high speed machine in order to escape in case of an attack.

As shown in Fig. 6, the upper wing 3 is provided with a notch or depression 9 which receives the upper part of the upper wing 10 of each of the sections 5 and 6, the lower face of each of the upper wings 10, when nested as shown in Fig. 6, acting as the lower stream line surface of plane 3. The same general arrangement is provided for the lower wing 4, namely an offset or notch 11, in the upper part of the wing for accommodating the lower wing 12 of each of the sections 5 and 6, the upper surface of each of said lower wings acting as the upper surface of wing 4. As shown in Fig. 6 and also Fig. 9 the sections 5 and 6 are guided by rollers 13 and 14 carried by the outer end of the central cell 2 and by rollers 15 and 16 carried by the inner end of the sections or cells 5 and 6, rollers 15 and 16 engaging the bars 18 and 19, while the rollers 13 and 14 ordinarily engage the longitudinal bars 20 and 21. Bars 18 and 19 are the lower longitudinal bars of the airplane to which the plane 4 is connected from, the bars 20 and 21 are the upper longitudinal bars of the adjustable cell or auxiliary section designed to be moved inwardly and outwardly. As shown in Fig. 6 the bars 18 and 19 are the usual bars now in common use and are associated with similar bars supporting the top plane 3 while similar upper and lower bars are provided for the adjustable section or cell so that there will be provided a rigid frame movable in the notches provided in the lower surface of the plane 3 and the upper surface of the plane 4. By providing rollers at the points specified the cells 5 and 6 may easily move in and out without friction and without any danger of getting caught in any of the parts as these rollers are continually engaging the longitudinal bars as specified.

Connected to the outer ends of the cells 5 and 6 are ailerons 22 of any usual preferred structure, said ailerons being used at the top and bottom as shown in Fig. 7. A cable 23 is connected to these ailerons in the usual manner and extends from the ailerons on section 5 to the ailerons on section 6, but in order to compensate the inward and outward movements of these cells the sections 24 of cable 23 pass over a pulley or other guide 25 on the inner end of wing 10 and over the pulley or other guide 26 on the outer end of cell 2. The lower section 27 of the cable 23 extends to the drum 28 operated by the wheel 8, said section 27 being guided by the pulleys 29 and 30. The movable compensating pulley 31 engages the section 27 between pulleys 29 and 30 as shown, for instance, in Fig. 7, said compensating pulley being connected with cable 32 passing over pulley 33 and then connected to a windlass 34. From the drum 28 a cable 27' extends and passes over the pulley 29' and thence around the compensating pulley 31'. From pulley 31' the cable 27' extends to the ailerons 22 of section 6 where it operates in the same manner as section 27 operates. The pulley 31' is connected by a suitable cable to cable 32 so as to operate simultaneously with pulley 31 and provides a proper compensation for both the cable sections 27 and 27'. It will be observed that the cells 5 and 6 are moved in and out by the rotation of the windlass 34 and consequently the cable sections 27 and 27' must be compensated as just described, which compensation is in proportion to the rotary movement of the windlass and the inward and outward movement of the cells.

As shown in Figs. 1 and 7 a system of cables is connected with cells 5 and 6 for moving the same in and out, all of these cables being connected with the windlass 34, there being one set of cables for each of the planes 10 and 12 of each of the cells, though in Fig. 1 only one set of cables has been illustrated, by reason of the sectional nature of the view. As shown in this figure cables 35 and 36 extend from windlass 34 over suitable pulleys or other form of guides to pulleys 37 and 38 on the outer ends of the central section of cell 2 and around these pulleys to the inner end of the cells 5 and 6 where they are connected at 39 and 40 to a strut of said cells. From the points 39 and 40 the cables 35 and 36 pass over suitable guides back to the windlass 34 whereby when said windlass is rotated in either direction the cells will be pulled inwardly or pulled outwardly. If the only power means for the cells 5 and 6 were the cables just mentioned the strain would be liable to cause a pinching action, and in order to obviate this pinching action, as set of cables 41 and 42 are provided which are connected with the windlass 34 and pass over suitable guiding members, as for instance, pulleys, including the end pulleys 43 and 44. The cables 41 and 42 are secured at 45 and 46 to a strut of the cells 5 and 6 whereby the bottom end of each of the cells will be pulled inwardly or pulled outwardly according to the direction of the windlass 34, as indicated clearly in Fig. 1. As shown in Fig. 7, similar pulleys to those just described are connected with the windlass 34 and operate immediately below the top so that there will be four cables connected with the inner end of each cell 5 and 6, so as to pull said sections both inwardly and outwardly from the four corners. By arranging the parts as just described it is evident that the aviator may rotate the windlass 34 at any time and to any extent so as to get any desired extension or contraction of the supporting surface. The various cables have been shown arranged in a certain way, but it is to be understood that these cables may be rearranged for the purpose of producing stream line effects and for simplifying the parts, without departing from the spirit of the invention, providing the rearrangement permits the pulling of the cells 5 and 6 inwardly and outwardly.

Figure 4:
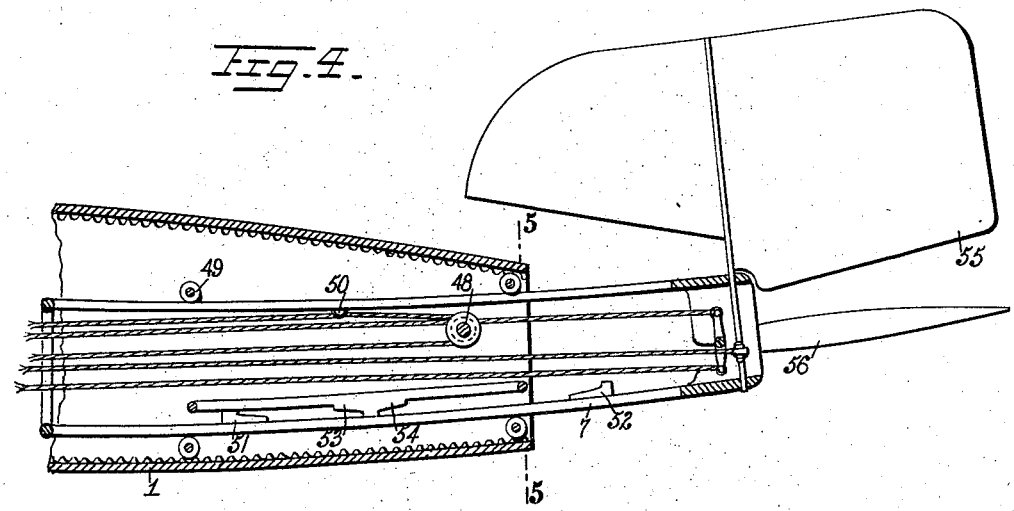
Fig. 4 is a detail, enlarged, fragmentary, longitudinal, vertical, sectional view through the rear part of the fuselage shown in Fig. 3 illustrating the extension tube and associate parts.
Figure 5:
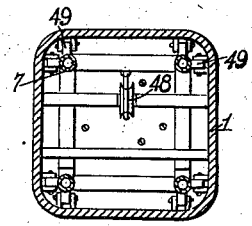
Fig. 5 is a transverse section through Fig. 4 on line 5—5.

In addition to having cables as above described connected with the cells 5 and 6 a cable 47, for instance, Figs. 4 and 7, extends from the windlass 34 over suitable guiding members to the rear end of the fuselage and over a guide pulley 48 mounted on the fuselage 1. The frame or tubular member 7 is guided by a plurality of guiding rollers 49 as shown in Figs. 4 and 5, so as to freely move in and out, cable 47 being connected at 50 with the frame or tubular member 7 so that when the cable is moved in one direction frame 7 will be pulled rearwardly and when moved in the opposite direction the frame 7 will be pulled forwardly. Blocks 51 and 52 are mounted on frame 7 and adapted to engage the stops 53 and 54 for limiting the back and forth movement of the extension or frame 7. Frame 7 carries at its outer end a rudder 55 and an elevator 56, which rudder and elevator are of the usual type, operating in the usual manner by the usual cables, which are connected with the wheel 8 and the pivotally mounted controlling bar 57 as shown in Fig. 7, which bar is arranged to be operated by the foot, though any other arrangement could be utilized without departing from the spirit of the invention. In order to compensate the change in varying the length of the fuselage by moving the frame 7 in and out, the various cables connected with the rudder and elevator pass over a plurality of guiding members 58, and pass over an equalizing bar 59 carrying guiding rollers engaging the cables between the guiding members 58, which take up the slack automatically by reason of the fact that the bar 59 is connected with the cable 60, which cable passes over suitable guiding members and is connected with the windlass 34. The cable, by this arrangement, is unwound or wound up simultaneously with the unwinding or winding up of the cable 47 so as to always and simultaneously compensate for the different positions of the rudder and elevator. In fact a compensating arrangement throughout is intended to be such as to automatically cause the controlling mechanism of the machine to be in proper condition for operating the rudder, elevator or ailerons without any adjustment of any part.

What I claim is:

1. An airplane comprising a fuselage, propelling means, steering means, an upper and a lower lifting plane forming a central section, an extensible section or cell formed with upper and lower planes arranged at each end of said central section, an aileron on each of said cells, controlling means for said ailerons, means for moving said cells toward and from the center of the central section, and compensating means for said controlling means for compensating the difference in position of said ailerons.

2. An airplane comprising a fuselage, propelling means, steering means, a plurality of spaced lifting planes forming a central section, a complete integral lifting cell adjacent each end of said central section, ailerons on each of said cells, means for sliding said cells inwardly and outwardly longitudinally of the central section so as to increase and decrease the effective sustaining surface of the airplane, controlling means for the ailerons, and compensating means for the controlling means for compensating the difference in distance of the ailerons from the center of said central section.

3. An airplane comprising a fuselage, propelling means, steering means, a plurality of lifting planes forming a central unit, a movable cell arranged at each end of said central unit extending from the central unit, each of said cells comprising a pair of lifting planes and truss members forming a complete rigid unit, balancing means in said cells, means for pulling said cells inwardly and outwardly longitudinally of the central section, controlling means for said balancing means, and a compensating mechanism compensating the varying lengths of said controlling means as said cells are moved.

4. An airplane comprising a fuselage, propelling means, steering means, a plurality of lifting planes forming a central section, a separate slidable section arranged between said lifting planes adjacent each end, each of said slidable sections being provided with upper and lower lifting planes, and means for rigidly holding same in place so as to form independent cells, means for simultaneously moving said cells longitudinally of the central section outwardly and inwardly, ailerons arranged on the outer ends of each of said cells, cables connected with said ailerons for operating same, and means for compensating the length of cables as the cells move inwardly and outwardly.

5. An airplane comprising a fuselage, propelling means, steering means, a rigidly trussed central section formed with upper and lower lifting planes, extensible rigidly trussed sections formed with upper and lower planes, there being an extensible section at each end of said central section, means for simultaneously moving said extensible sections toward and from the center of the central section so as to increase and decrease the effective sustaining surface of the airplane, ailerons on each of said extensible sections, controlling means for said ailerons, and means for compensating for the difference in distance between said ailerons and the center of said central section 6. An airplane comprising a fuselage, propelling means, steering means, a pair of lifting planes, the upper plane having a notch in the lower surface and the lower plane having a notch or depression in the upper surface, a lifting cell arranged between said lifting planes adjacent the ends thereof, each of said lifting cells comprising an upper lifting auxiliary plane and a lower lifting auxiliary plane, said planes fitting in said notches or depressions when nested causing the planes to conform to stream lines, and means for moving said cells inwardly and outwardly longitudinally of the lifting planes.

7. An airplane of the character described comprising a fuselage, propelling means, steering means, an upper and a lower lifting plane, the upper lifting plane being provided with a notch in the under surface and the lower lifting plane being provided with a notch in its upper surface, an auxiliary lifting cell having an upper and a lower plane, the planes of said cell fitting into said notches, and means for moving said auxiliary lifting cells longitudinally of the first mentioned lifting planes for increasing or decreasing the lifting surface of the airplane.

8. An airplane comprising a fuselage, propelling means, steering means, a plurality of lifting planes forming a central section, a separate slidable section or cell arranged between said lifting planes adjacent each end, an aileron on each of said slidable sections or cells, means for simultaneously moving said slidable cells longitudinally of the central section outwardly and inwardly, cables connected with said ailerons for operating the same, and means for compensating the length of cables as the cells move inwardly and outwardly.

NORBERT CAROLIN.